(12) United States Patent
Tange et al.

(10) Patent No.: US 9,506,400 B2
(45) Date of Patent: Nov. 29, 2016

(54) HYDROGEN GENERATOR, AMMONIA-BURNING INTERNAL COMBUSTION ENGINE, AND FUEL CELL

(71) Applicant: TOYOTA JIDOSHA KABUSHIKI KAISHA, Toyota-shi, Aichi (JP)

(72) Inventors: Kyoichi Tange, Susono (JP); Norihiko Nakamura, Mishima (JP); Haruyuki Nakanishi, Susono (JP); Hidekazu Arikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 14/267,427

(22) Filed: May 1, 2014

(65) Prior Publication Data

US 2014/0238316 A1    Aug. 28, 2014

Related U.S. Application Data

(62) Division of application No. 12/920,991, filed as application No. PCT/JP2009/056013 on Mar. 18, 2009, now abandoned.

(30) Foreign Application Priority Data

Mar. 18, 2008 (JP) ................................ 2008-070360

(51) Int. Cl.
   *C01B 3/36* (2006.01)
   *B01J 7/00* (2006.01)
   (Continued)

(52) U.S. Cl.
   CPC .............. *F02B 43/10* (2013.01); *C01B 3/047* (2013.01); *C01B 3/06* (2013.01); *F02M 25/12* (2013.01);
   (Continued)

(58) Field of Classification Search
   CPC ............................. Y02E 60/364; C01B 3/047
   See application file for complete search history.

(56) References Cited

U.S. PATENT DOCUMENTS 3,652,431 A    3/1972  Reynolds
3,979,336 A    9/1976  Golosman et al.
(Continued)

FOREIGN PATENT DOCUMENTS

CN    A-1507369    6/2004
CN    A-1976167    6/2007
(Continued)

OTHER PUBLICATIONS

Apr. 9, 2014 Advisory Action issued in U.S. Appl. No. 12/920,991.
(Continued)

*Primary Examiner* — Imran Akram
(74) *Attorney, Agent, or Firm* — Oliff PLC

(57) ABSTRACT

A hydrogen generator that can be operated in a broad temperature range is disclosed, which comprises a first ammonia conversion part having a hydrogen-generating material which reacts with ammonia in a first temperature range so as to generate hydrogen; a second ammonia conversion part having an ammonia-decomposing catalyst which decomposes ammonia into hydrogen and nitrogen in a second temperature range; an ammonia supply part which supplies ammonia; and an ammonia supply passage which supplies ammonia from said ammonia supply part to the first and second ammonia conversion parts. The first temperature range includes temperatures lower than the second temperature range, and hydrogen is generated from ammonia by selectively using the first and second ammonia conversion parts. An ammonia-burning internal combustion engine and a fuel cell having the hydrogen generator are also disclosed.

12 Claims, 10 Drawing Sheets

Figure 1:
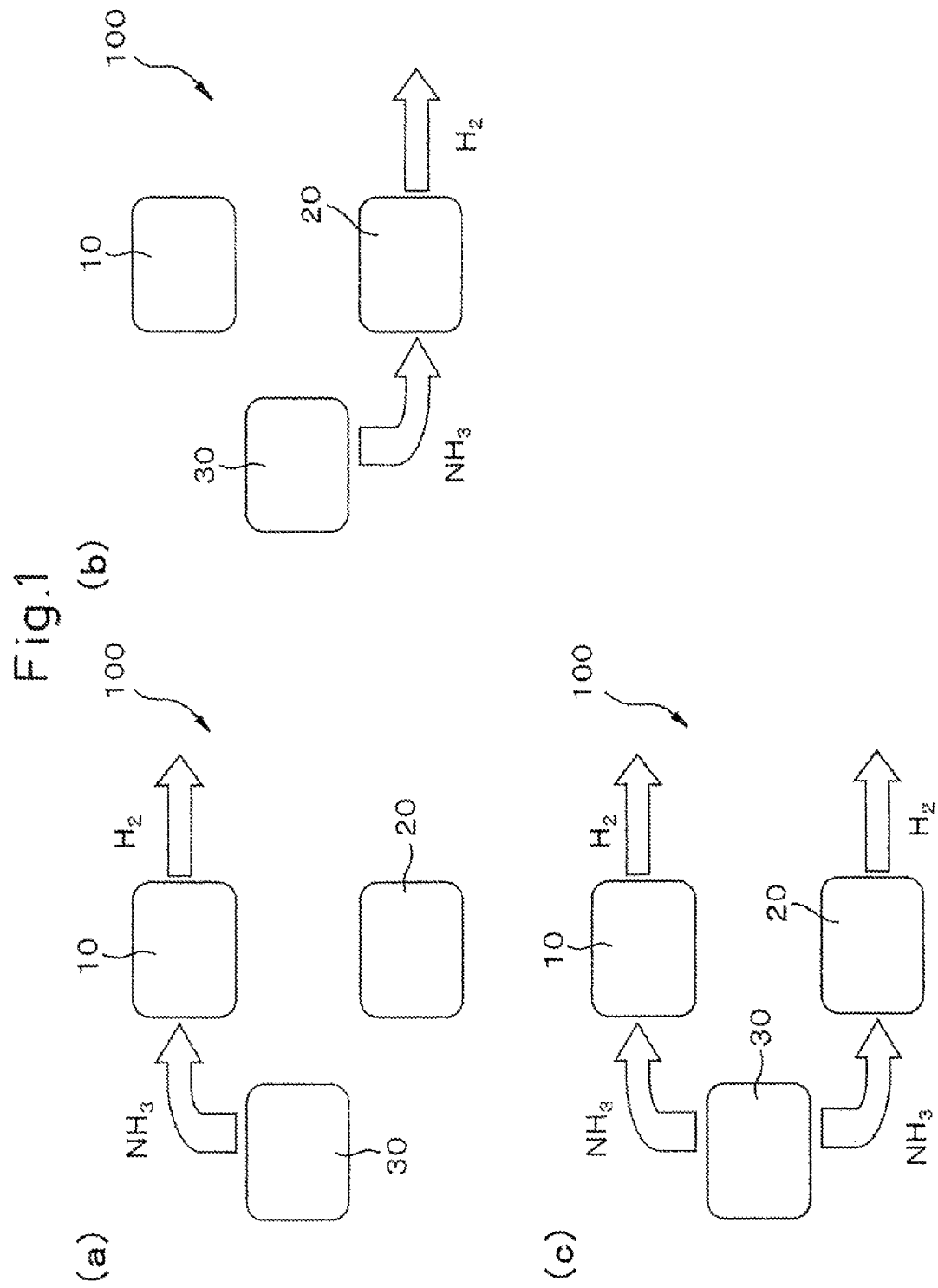

(51) Int. Cl.
F02B 43/10 (2006.01)
C01B 3/04 (2006.01)
F02M 25/12 (2006.01)
H01M 8/04 (2016.01)
H01M 8/06 (2016.01)
C01B 3/06 (2006.01)

(52) U.S. Cl.
CPC ....... H01M 8/04201 (2013.01); H01M 8/0606 (2013.01); C01B 2203/066 (2013.01); C01B 2203/1047 (2013.01); C01B 2203/1052 (2013.01); C01B 2203/1058 (2013.01); C01B 2203/1064 (2013.01); Y02E 60/364 (2013.01); Y02E 60/50 (2013.01); Y02T 10/121 (2013.01)

(56) References Cited

U.S. PATENT DOCUMENTS

| | | | |
|---|---|---|---|
| 4,143,122 A * | 3/1979 | Laufhutte | B01D 53/48 423/237 |
| 4,157,270 A | 6/1979 | Martignoni et al. | |
| 4,341,651 A | 7/1982 | Beckert et al. | |
| 4,464,188 A | 8/1984 | Agrawal et al. | |
| 4,668,494 A | 5/1987 | Van Hook | |
| 4,938,855 A | 7/1990 | Lichtin et al. | |
| 6,100,600 A | 8/2000 | Pflanz | |
| 6,425,248 B1 | 7/2002 | Tonomura et al. | |
| 6,505,467 B1 | 1/2003 | Fjellhaug et al. | |
| 7,075,189 B2 | 7/2006 | Heronemus et al. | |
| 7,178,337 B2 | 2/2007 | Pflanz | |
| 7,459,880 B1 | 12/2008 | Rosen | |
| 2001/0031236 A1 | 10/2001 | Ohtsuka | |
| 2003/0168864 A1 | 9/2003 | Heronemus et al. | |
| 2004/0013923 A1 | 1/2004 | Molter et al. | |
| 2004/0154223 A1 | 8/2004 | Powell et al. | |
| 2004/0154299 A1 | 8/2004 | Appa et al. | |
| 2005/0026008 A1 | 2/2005 | Heaton et al. | |
| 2005/0281735 A1 * | 12/2005 | Chellappa | B01J 19/2475 423/648.1 |
| 2006/0048808 A1 | 3/2006 | Ruckman et al. | |
| 2006/0049063 A1 | 3/2006 | Murphy et al. | |
| 2006/0112636 A1 | 6/2006 | Chellappa et al. | |
| 2006/0127304 A1 | 6/2006 | Fujii et al. | |
| 2006/0210454 A1 | 9/2006 | Saxena et al. | |
| 2006/0243585 A1 | 11/2006 | Spiegelman et al. | |
| 2007/0101762 A1 | 5/2007 | Schaub et al. | |
| 2007/0101989 A1 | 5/2007 | Strathman | |
| 2007/0253894 A1 | 11/2007 | Mohajeri et al. | |
| 2007/0276547 A1 | 11/2007 | Miller | |
| 2008/0000350 A1 | 1/2008 | Mundschau et al. | |
| 2008/0035346 A1 | 2/2008 | Nair et al. | |
| 2008/0041054 A1 | 2/2008 | Montesinos | |
| 2008/0131830 A1 | 6/2008 | Nix | |
| 2008/0138675 A1 | 6/2008 | Jang et al. | |
| 2008/0216478 A1 | 9/2008 | Cherry | |
| 2008/0216511 A1 | 9/2008 | Howard | |
| 2008/0241033 A1 | 10/2008 | Nazri | |
| 2008/0241613 A1 | 10/2008 | Kelly et al. | |
| 2008/0274033 A1 | 11/2008 | Meisner et al. | |
| 2008/0283411 A1 | 11/2008 | Eastman et al. | |
| 2008/0311022 A1 | 12/2008 | Carrington et al. | |
| 2008/0314593 A1 | 12/2008 | Vinegar et al. | |
| 2009/0011297 A1 | 1/2009 | Jang et al. | |
| 2009/0014336 A1 | 1/2009 | Olah et al. | |
| 2009/0056802 A1 | 3/2009 | Rabani | |
| 2009/0071155 A1 | 3/2009 | Boyapati et al. | |
| 2009/0120294 A1 | 5/2009 | Schulte et al. | |
| 2009/0125127 A1 | 5/2009 | Bergman et al. | |
| 2009/0211541 A1 | 8/2009 | Nakamura | |
| 2009/0304574 A1 * | 12/2009 | Ravikumar | C01B 3/047 423/658.2 |
| 2010/0003184 A1 | 1/2010 | Nakamura | |
| 2010/0024403 A1 | 2/2010 | Johannessen et al. | |

FOREIGN PATENT DOCUMENTS

| | | |
|---|---|---|
| CN | A-101077840 | 11/2007 |
| JP | A-50-114625 | 9/1975 |
| JP | A-61-153136 | 7/1986 |
| JP | A-62-502610 | 10/1987 |
| JP | A-05-009769 | 1/1993 |
| JP | A-05-332152 | 12/1993 |
| JP | A-11-046460 | 2/1999 |
| JP | A-2000-178467 | 6/2000 |
| JP | 2002-184417 A | 6/2002 |
| JP | A-2002-520533 | 7/2002 |
| JP | A-2004-035383 | 2/2004 |
| JP | A-2004-525058 | 8/2004 |
| JP | A-2005-044758 | 2/2005 |
| JP | A-2005-154232 | 6/2005 |
| JP | A-2005-200245 | 7/2005 |
| JP | A-2005-281115 | 10/2005 |
| JP | A-2005-337220 | 12/2005 |
| JP | 2006-235846 A | 9/2006 |
| JP | A-2006-319291 | 11/2006 |
| JP | A-2006-526882 | 11/2006 |
| JP | A-2008-508184 | 3/2008 |
| JP | 2008-077561 A | 4/2008 |
| JP | A-2010-159194 | 7/2010 |
| WO | WO02/071451 A2 | 9/2002 |
| WO | WO 2004/109086 A2 | 12/2004 |
| WO | WO 2009/104813 A1 | 8/2009 |
| WO | WO 2009/104820 A1 | 8/2009 |
| WO | WO 2009/116679 A1 | 9/2009 |

OTHER PUBLICATIONS

Jun. 10, 2014 Office Action issued in U.S. Appl. No. 13/318,223.
Nov. 26, 2014 Office Action issued in U.S. Appl. No. 12/883,808.
Feb. 9, 2015 Advisory Action issued in U.S. Appl. No. 13/318,223.
Mar. 19, 2015 Office Action issued in U.S. Appl. No. 12/883,808.
International Search Report in International Application No. PCT/JP2009/056013, dated Apr. 28, 2009.
International Search Report issued in JP Application No. PCT/JP2009/053613 mailed Apr. 7, 2009.
International Search Report issued in PCT/JP2009/053624 mailed Mar. 24, 2009.
Office Action issued in U.S. Appl. No. 12/071,561 mailed Dec. 23, 2009.
Office Action issued in U.S. Appl. No. 12/071,557 mailed Jan. 28, 2010.
Office Action issued in U.S. Appl. No. 12/071,557 mailed on Aug. 6, 2010.
Norihiko Nakamura, U.S. Appl. No. 12/071,557, filed Feb. 22, 2008.
Norihiko Nakamura et al., U.S. Appl. No. 12/883,808, filed Sep. 16, 2010.
Feb. 8, 2011 Office Action issued in U.S. Appl. No. 12/071,557.
Translation of International Preliminary Report on Patentability, issued in International Application No. PCT/JP2009/056013, dated Jul. 29, 2010.
Aug. 29, 2011 Office Action issued in U.S. Appl. No. 12/071,557.
Roeb et al., "Solar Hydrogen Production by a Two Step Cycle Based on Mixed Iron Oxides," May 2006, Journal of Solar Engineering, vol. 125, pp. 125-133.
Lovegrove et al., "Developing Ammonia Based Thermochemical Energy Storage for Dish Power Plants," 2004, Solar Energy, vol. 76, pp. 331-337.
Nov. 9, 2011 Chinese Office Action issued in Application No. 200980105327.2.
Japanese Patent Office, Notice of Reasons for Rejection mailed Jan. 17, 2012 in Japanese Patent Application No. 2008-042012.
Luzzi, A. et al., "Techno-Economic Analysis of a 10 $Mw_e$ Solar Thermal Power Plant Using Ammonia-Based Thermochemical Energy Storage," *Solar Energy*, 1999, pp. 91-101, vol. 66, No. 2.
Kreetz, H. et al., "Maximizing Thermal Power Output of an Ammonia Synthesis Reactor for a Solar Thermochemical Energy Storage System," *Journal of Solar Energy Engineering*, May 2001, pp. 75-82, vol. 123.

(56) References Cited

OTHER PUBLICATIONS

Appl, M., "Ammonia," *Ullmann's Encyclopedia of Industrial Chemistry*, 2006, pp. 44, 45, 52, 62, 63, 79, 80, 84, 85, 98-109.
International Search Report issued in International Application No. PCT/JP2010/057918 on Aug. 10, 2010.
Feb. 3, 2012 Notice of Allowance issued in U.S. Appl. No. 12/071,557.
Kubic, William L., Jr., "Nuclear-Power Ammonia Production", Process Engineering, Modeling, and Analysis Group, Los Alamos National Laboratory, Los Alamos, New Mexico, Oct. 9, 2006.
Sep. 7, 2012 Office Action issued in U.S. Appl. 12/883,808.
"Ammonia-based hydrogen source for fuel cell applications", Lixiong Li et al., International Journal of Hydrogen Energy, 32 (2007), pp. 6-10.
Ma et al., "Direct Utilization of ammonia in intermediate-temperature solid oxide fuel cells," Electrochemistry Communications 8, 2006, 1791-1795.
Apr. 12, 2013 Office Action issued in U.S. Appl. No. 12/883,808.
Office Action issued in Australian Patent Application No. 2010245500 dated Sep. 14, 2012.
Jul. 16, 2013 Office Action issued in U.S. Appl. No. 13/318,223.
Licht, Stuart, "Solar Water Splitting to Generate Hydrogen Fuel: Photothermal Electrochemical Analysis," 2003, Journal Physical Chemistry B, vol. 107, pp. 4253-4260.
U.S. Office Action issued in U.S. Appl. No. 13/318,223 mailed Dec. 18, 2013.
Garabedtan et al. "The Theory of Operation of an Ammonia Burning Internal Combustion Engine", Army Tank-Automotive Center Warren, MI, AD0634681, pp. 333-348, Jun. 1966.
Office Action in U.S. Appl. No. 12/883,808 mailed Oct. 10, 2013.
Apr. 10, 2015 Office Action issued in U.S. Appl. No. 13/318,223.
May 2, 2014 Office Action issued in U.S. Appl. No. 12/883,808.
Sep. 2, 2015 Office Action issued in U.S. Appl. No. 13/318,223.
Oct. 20, 2014 Office Action issued in U.S. Appl. No. 13/318,223.
Sep. 10, 2014 Advisory Action issued in U.S. Appl. No. 12/883,808.

\* cited by examiner

Fig.2
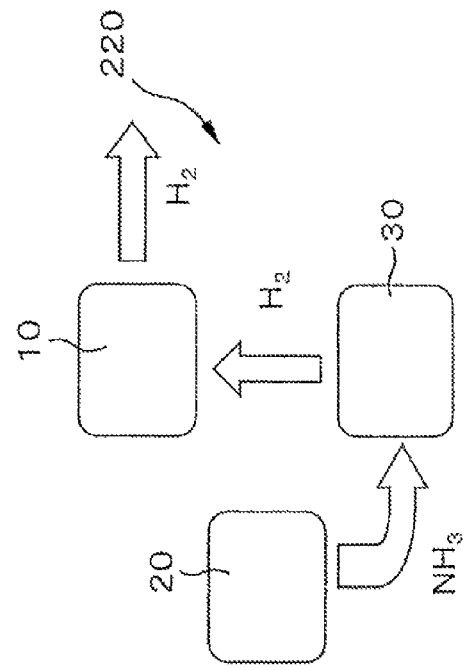
(b)
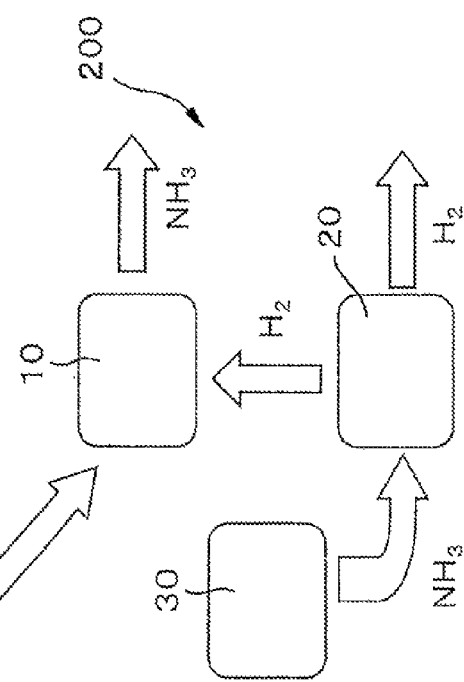
(a)
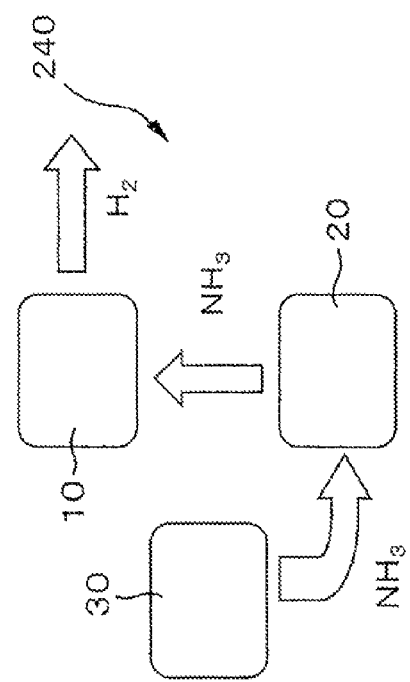
(c)

HYDROGEN GENERATOR, AMMONIA-BURNING INTERNAL COMBUSTION ENGINE, AND FUEL CELL

This is a Divisional of application Ser. No. 12/920,991 filed Sep. 22, 2010, which claims priority under 35 U.S.C. §371 to International Application No.: PCT/JP2009/056013, filed Mar. 18, 2009, which claims priority to Japanese Patent Application No.: 2008-070360, filed on Mar. 18, 2008, the disclosures of each of which are hereby incorporated by reference herein in their entireties.

TECHNICAL FIELD

The present invention relates to a hydrogen generator which generates hydrogen from ammonia, and an ammonia-burning internal combustion engine and a fuel cell having the hydrogen generator.

BACKGROUND ART

Recently, due to environmental concerns, such as global warming arising from the emission of carbon dioxide and energy issues of the depletion of oil resources, studies focusing on ammonia as an alternative clean energy source as a substitute for hydrocarbon fuels have been carried out, and for example, it is proposed to obtain motor power by combusting ammonia gas in an internal combustion engine. In this regard, Japanese Unexamined Patent Publication (Kokai) No. 5-332152 describes that hydrogen, in addition to ammonia, is combusted in an internal combustion engine in order to improve the combustion performance of ammonia. In addition, Japanese Unexamined Patent Publication (Kokai) No. 5-332152 proposes an ammonia-burning internal combustion engine having an ammonia-decomposing reaction means which decomposes ammonia by use of the heat of exhaust gas after the combustion of ammonia in the internal combustion engine, and a hydrogen-storing alloy which accumulates hydrogen gas obtained by the ammonia-decomposing reaction means.

DISCLOSURE OF THE INVENTION

Problem to be Solved by the Invention

The present invention provides a hydrogen generator which can be operated in a wide temperature range, and an ammonia-burning internal combustion engine and a fuel cell having the hydrogen generator.

Means for Solving the Problem (1) A hydrogen generator comprising;
a first ammonia conversion part having a hydrogen-generating material which reacts with ammonia in a first temperature range so as to generate hydrogen;
a second ammonia conversion part having an ammonia-decomposing catalyst which decomposes ammonia into hydrogen and nitrogen in a second temperature range;
an ammonia supply part which supplies ammonia; and
an ammonia supply passage which supplies ammonia from the ammonia supply part to the first and second ammonia conversion parts;
wherein
the first temperature range includes temperatures lower than the second temperature range, and hydrogen is generated from ammonia by selectively using the first and second ammonia conversion parts.

(2) The hydrogen generator as described in (1) above, wherein
the hydrogen-generating material is a material which generates hydrogen by reaction with ammonia without heating under room temperature, and the ammonia-decomposing catalyst comprises a metal which can decompose ammonia into hydrogen and nitrogen only when heated from the room temperature.

(3) The hydrogen generator as described in (1) or (2) above, comprising a hydrogen passage for recycling which supplies the hydrogen obtained in the second ammonia conversion part to the first ammonia conversion part.

(4) The hydrogen generator as described in any one of (1) to (3) above, comprising a heat source which provides heat to the first and/or second ammonia conversion parts.

(5) The hydrogen generator as described in (4) above, wherein
the heat source is the combustion/oxidation heat arising from the combustion/oxidation of hydrogen generated in the first and/or second ammonia conversion parts.

(6) The hydrogen generator as described in any one of (1) to (5) above, which supplies all of the hydrogen obtained in the second ammonia conversion part to the first ammonia conversion part.

(7) The hydrogen generator as described in any one of (1) to (6) above, which supplies the ammonia supplied by the ammonia supply part to the first ammonia conversion part only through the second ammonia conversion part.

(8) The hydrogen generator as described in any one of (1) to (7) above, wherein the hydrogen-generating material is a material which reacts with ammonia to generate hydrogen in the temperature range comprising, at least, 0° C. to 30° C.

(9) The hydrogen generator as described in any one of (1) to (8) above, wherein the hydrogen-generating material is a material selected from the group consisting of alkali metals, alkali earth metals, alkali metal hydrides, alkali earth metal hydrides, and a combination thereof.

(10) The hydrogen generator as described in (9) above, wherein the hydrogen-generating material is a material selected from the group consisting of alkali metal hydrides, alkali earth metal hydrides, and a combination thereof.

(11) The hydrogen generator as described in (10) above, wherein the hydrogen-generating material is a material selected from the group consisting of lithium hydride, sodium hydride, potassium hydride, and a combination thereof.

(12) The hydrogen generator as described in any one of (1) to (11) above, wherein the ammonia-decomposing catalyst comprises a metal selected from the group of transition metals.

(13) The hydrogen generator as described in (12) above, wherein the ammonia-decomposing catalyst comprises a metal selected from the group of ruthenium, nickel, cobalt, and iron.

(14) An ammonia-burning internal combustion engine, having the hydrogen generator as described in any one of (1) to (13) above and an internal combustion engine main unit, wherein the internal combustion engine main unit generates motor power by combusting, in addition to ammonia, hydrogen which is supplied by the hydrogen generator.

(15) The ammonia-burning internal, combustion engine as described in (14) above, further having an exhaust gas passage for heat exchange, which provides heat to the first and/or second ammonia conversion parts by the exhaust gas from the internal combustion engine main unit.

(16) The ammonia-burning internal combustion engine as described in (15) above, wherein the exhaust gas passage for heat exchange has a bypass passage, through which the exhaust gas bypasses the first ammonia conversion part.

(17) The ammonia-burning internal combustion engine as described in any one of (14) to (16) above, wherein the molar ratio of ammonia and hydrogen which are combusted in the internal combustion engine main unit (ammonia:hydrogen) is in the range of 100:0 to 50:50.

(18) A fuel cell having the hydrogen generator as described in any one of (1) to (13) above and a fuel cell main unit, wherein the fuel cell main unit generates electric power by oxidizing the hydrogen supplied by the hydrogen generator.

Technical Advantage of the Invention

According to the above hydrogen generator, hydrogen can be obtained from ammonia in a relatively wide temperature range. While hydrogen is effective as a fuel for a fuel cell and a combustion additive for an ammonia-burning internal combustion engine, the ammonia-decomposing reaction means of the above-mentioned Japanese Unexamined Patent Publication (Kokai) No. 5-332152 requires heat with a relatively high temperature, and thus requires a large-scale hydrogen reserve unit for hydrogen storage so as to supply hydrogen in the case of low temperature. On the other hand, the above hydrogen generator can obtain hydrogen from ammonia over a relatively wide temperature range, and therefore resolve the problems of hydrogen storage.

Ammonia is currently produced worldwide, and used mainly for fertilizers in a large amount. Ammonia is commercially used in this way in a large amount, and therefore it is assumed that ammonia is socially accepted.

The physical properties of ammonia are close to those of liquefied petroleum gas (LPG). Ammonia easily liquefies under a pressure of around 8 atm at room temperature, and is commonly stored and transported without any particular problem. In addition, ammonia is defined as a nonflammable material, difficult to ignite. Further, even if ammonia is ignited, the burning speed is slow, and the flammable region is narrow, thus is safe to handle.

BRIEF DESCRIPTION OF THE INVENTION

Figure 3:
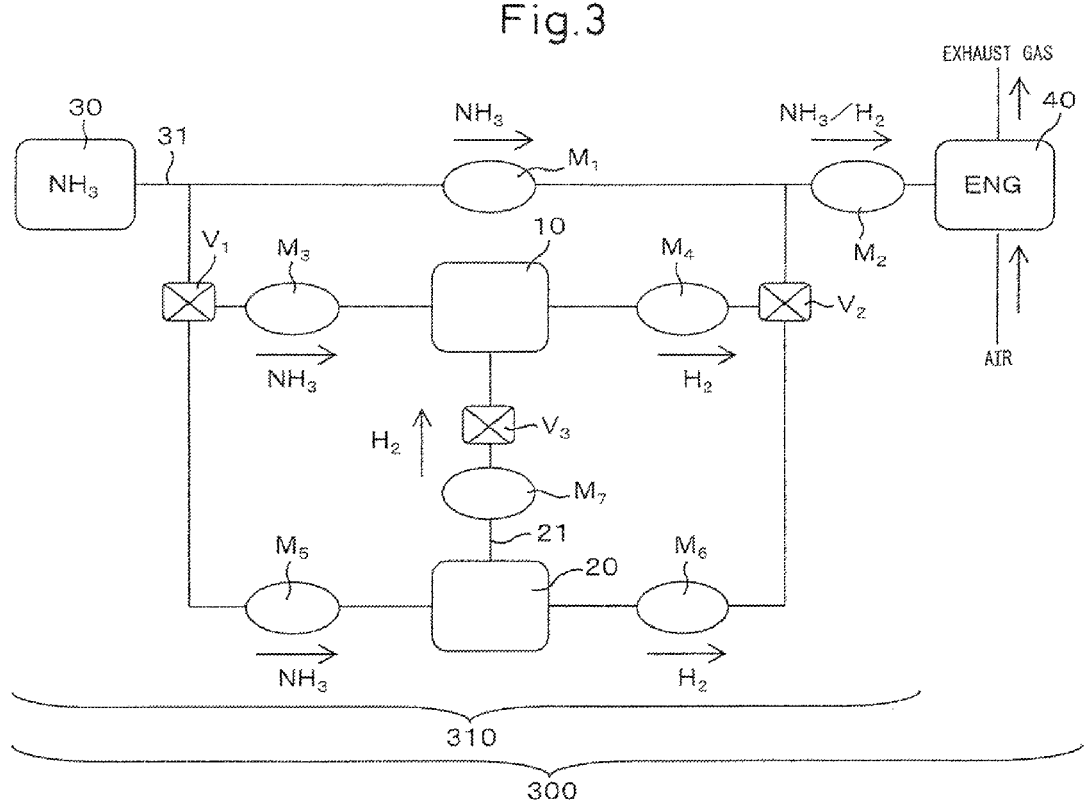
Figure 4:
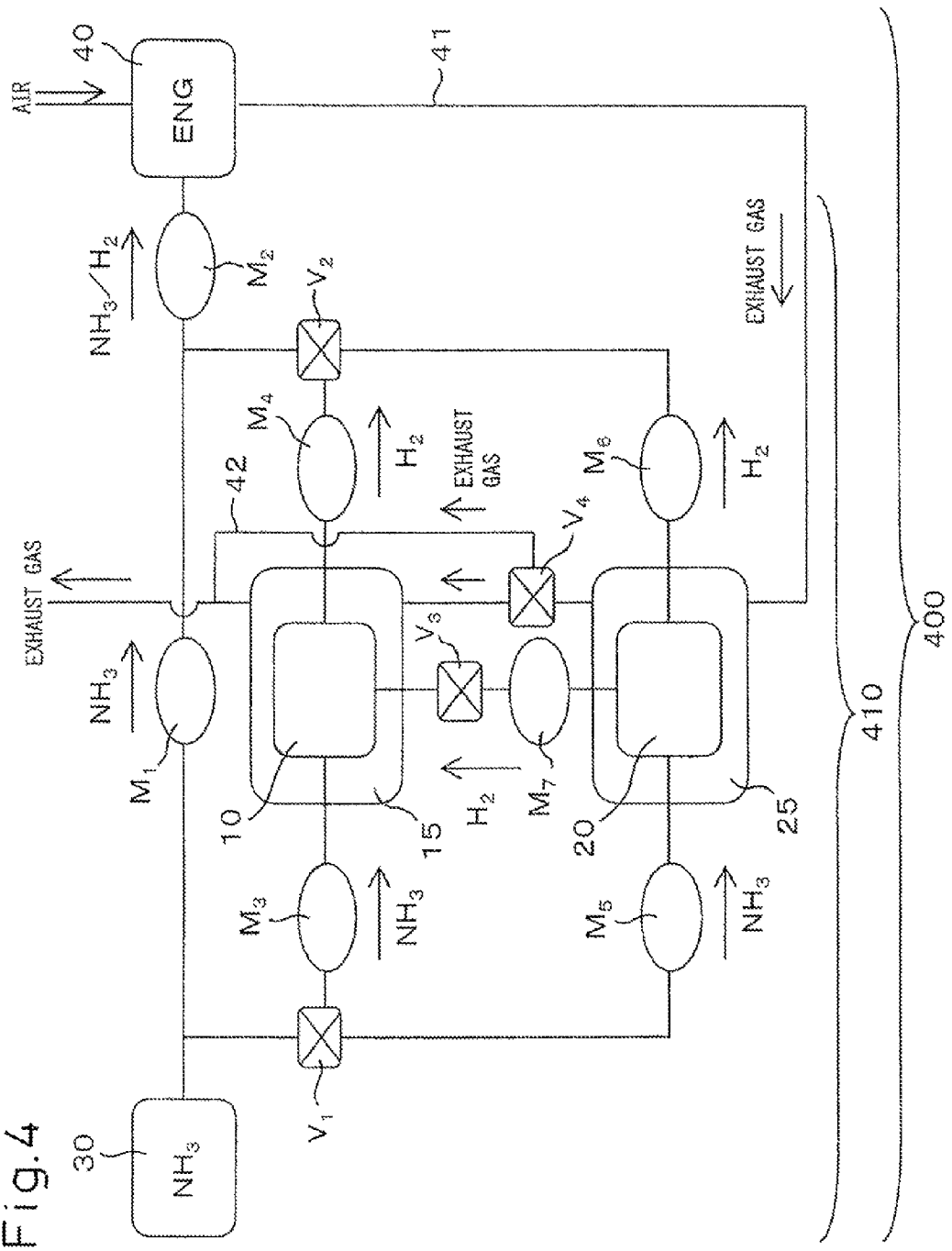
Figure 5:
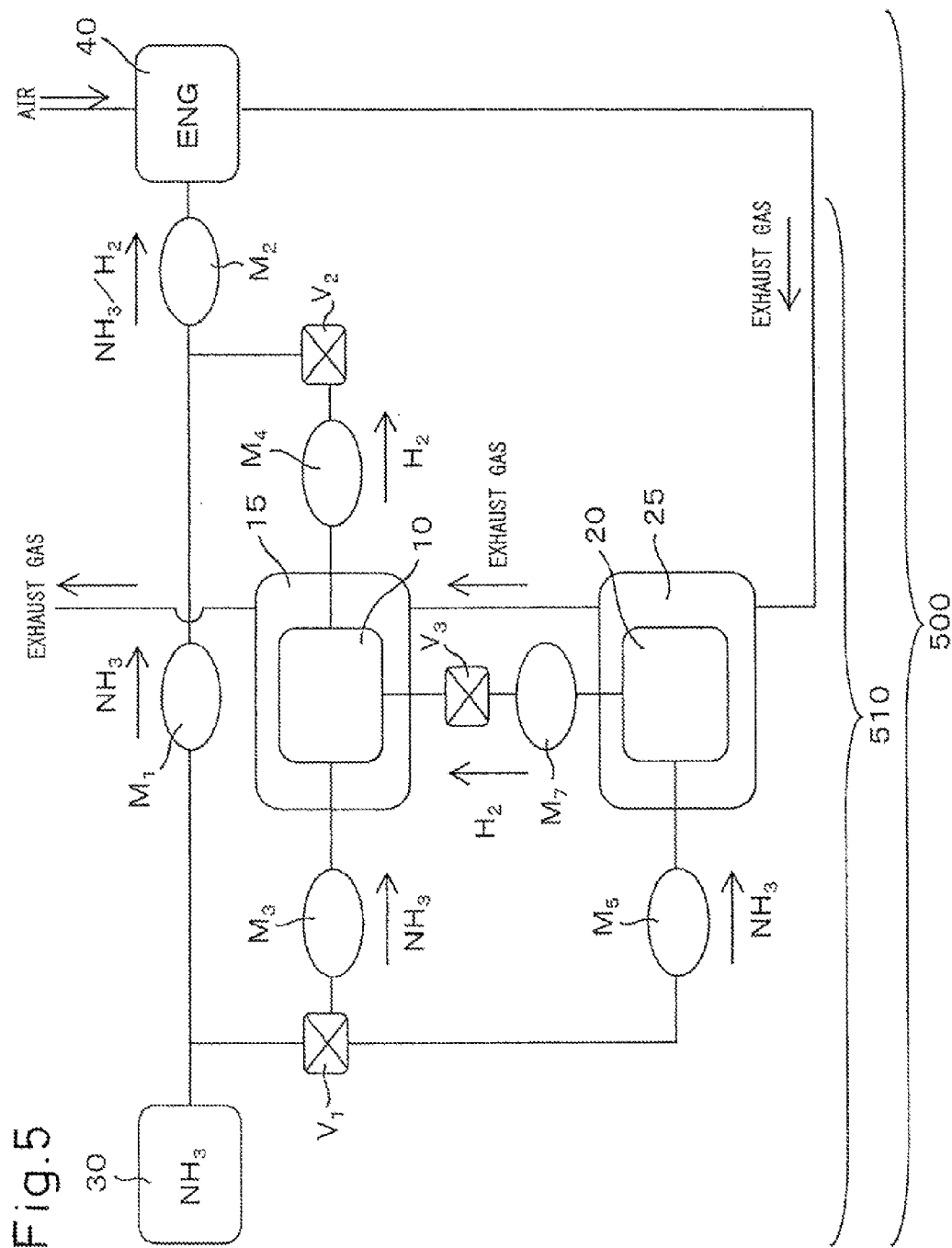
Figure 6:
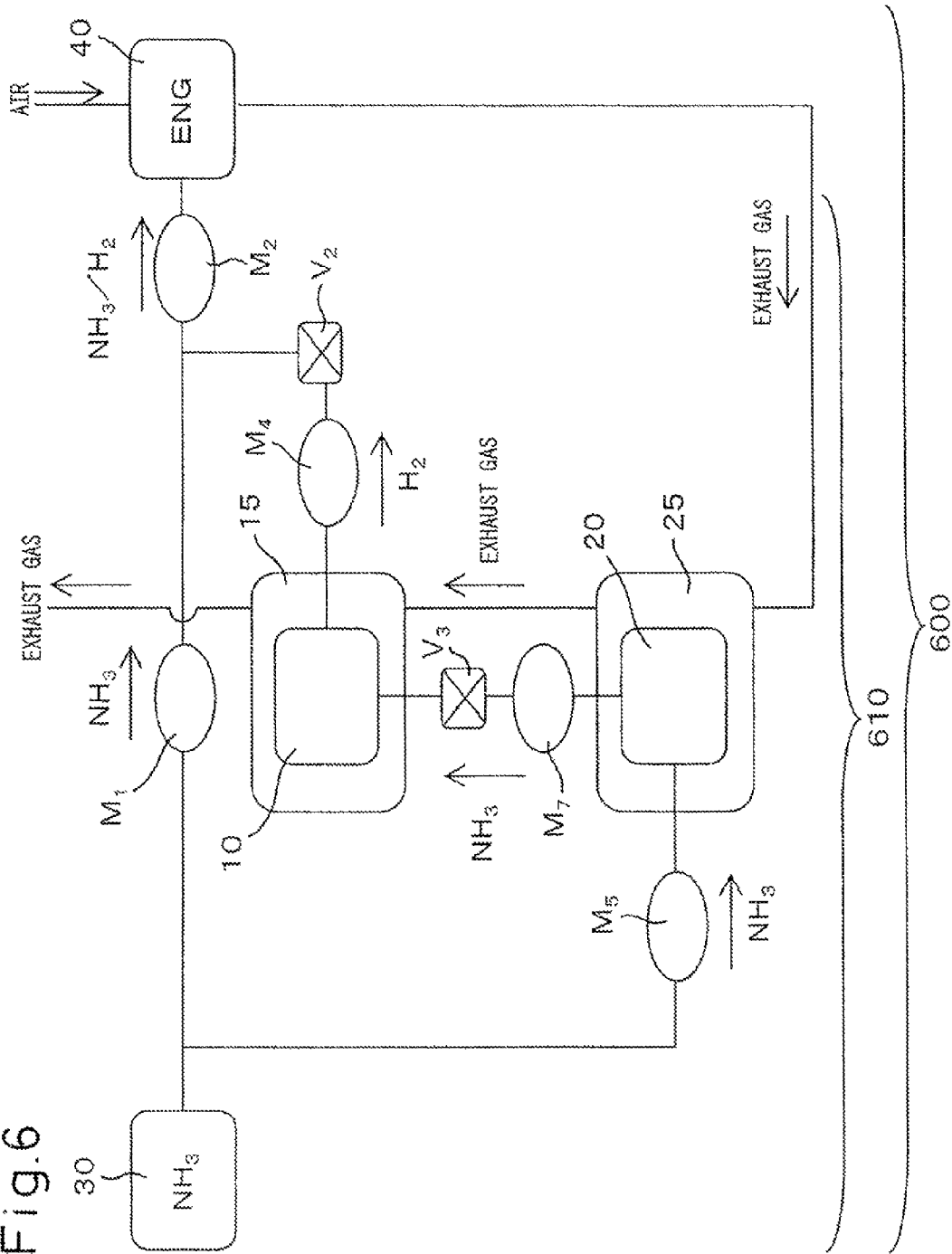
Figure 7:
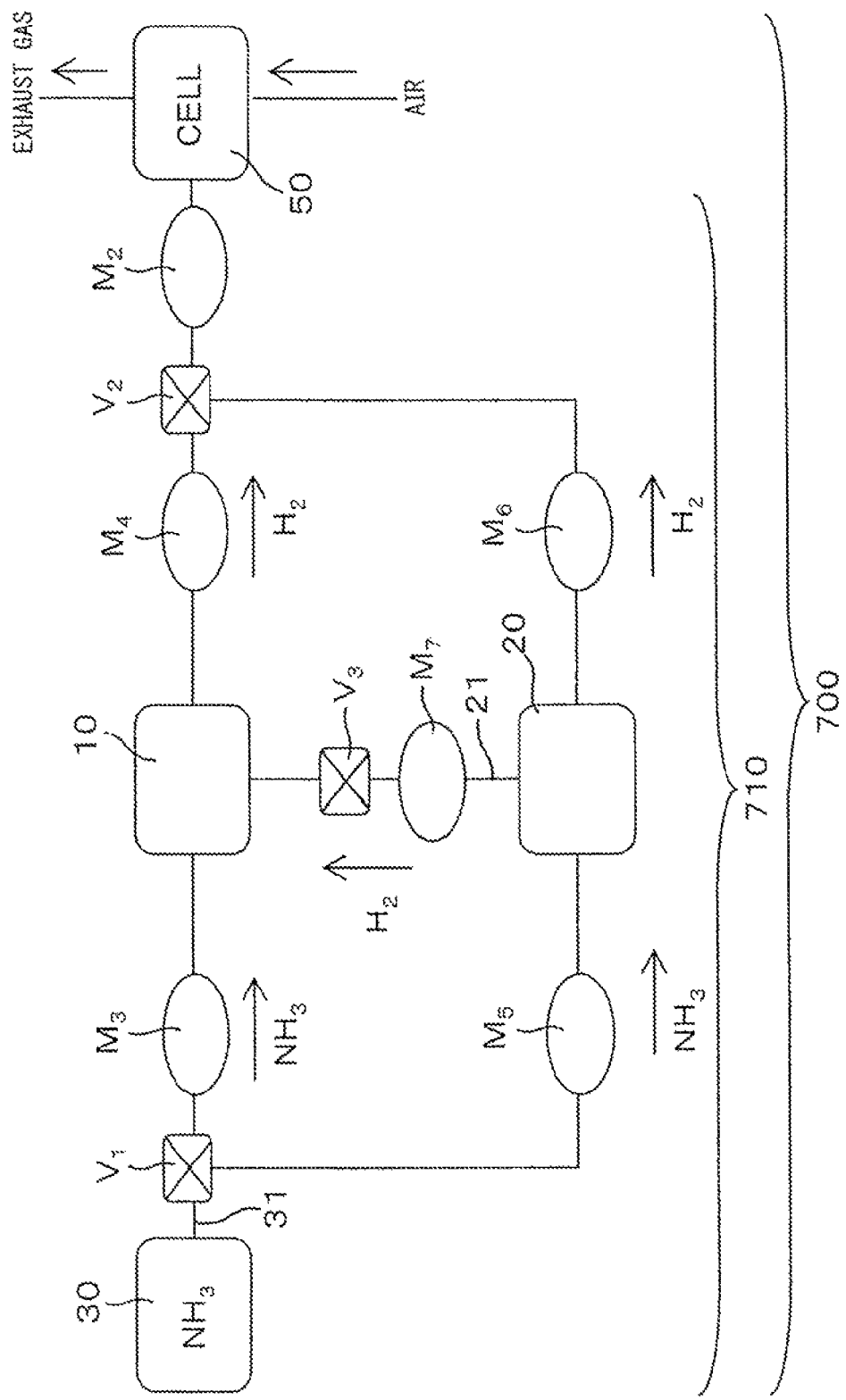
Figure 8:
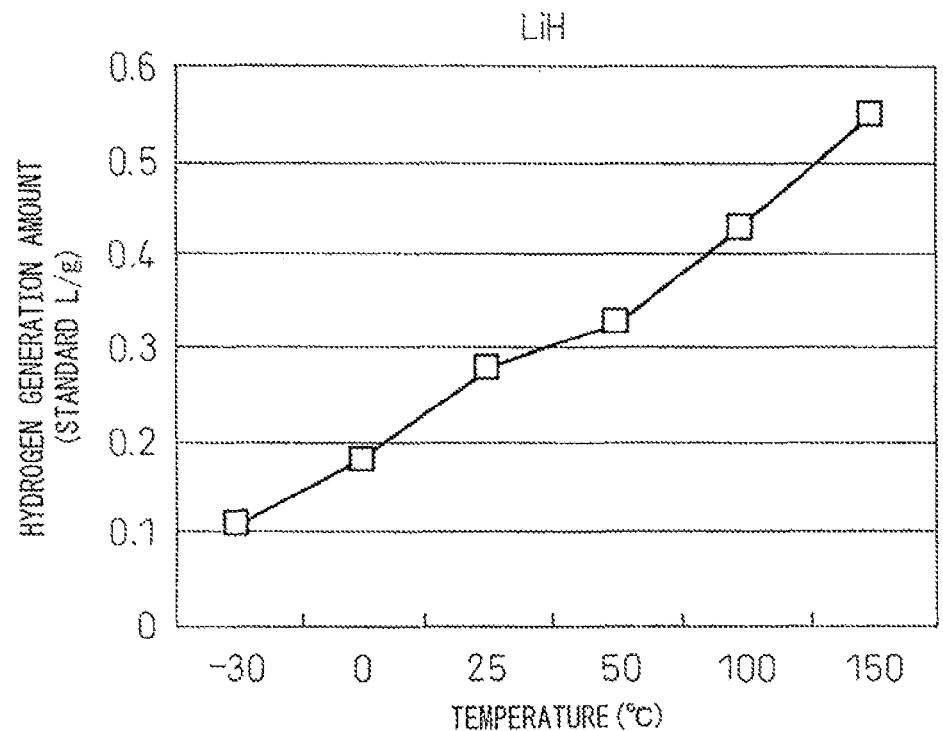
Figure 9:
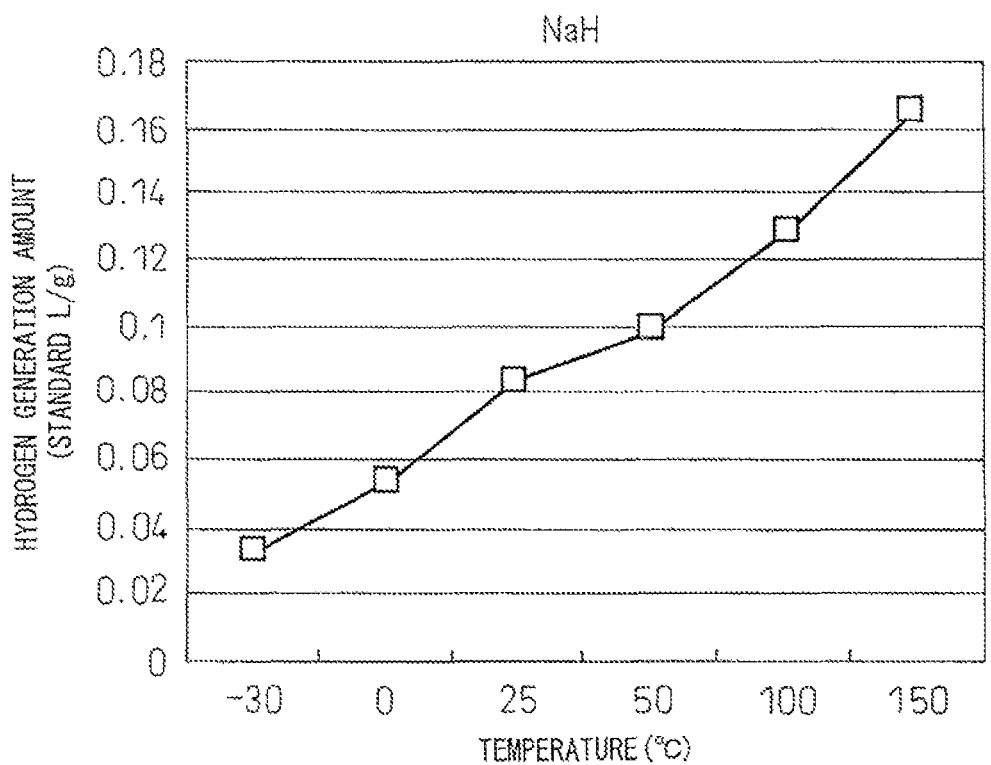
Figure 10:
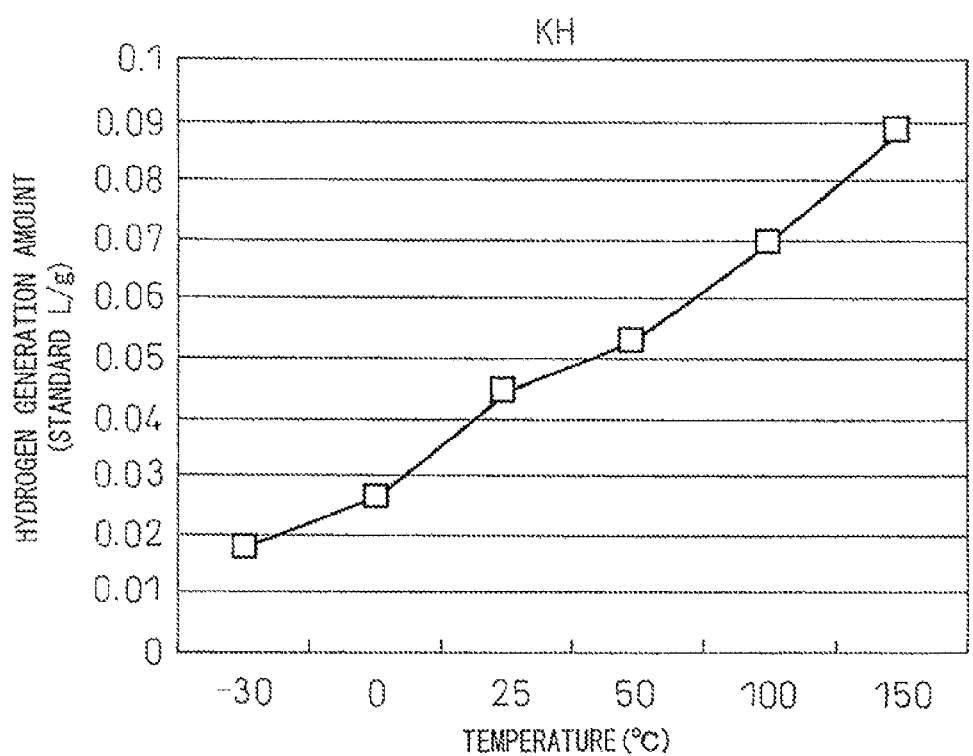
Figure 11:
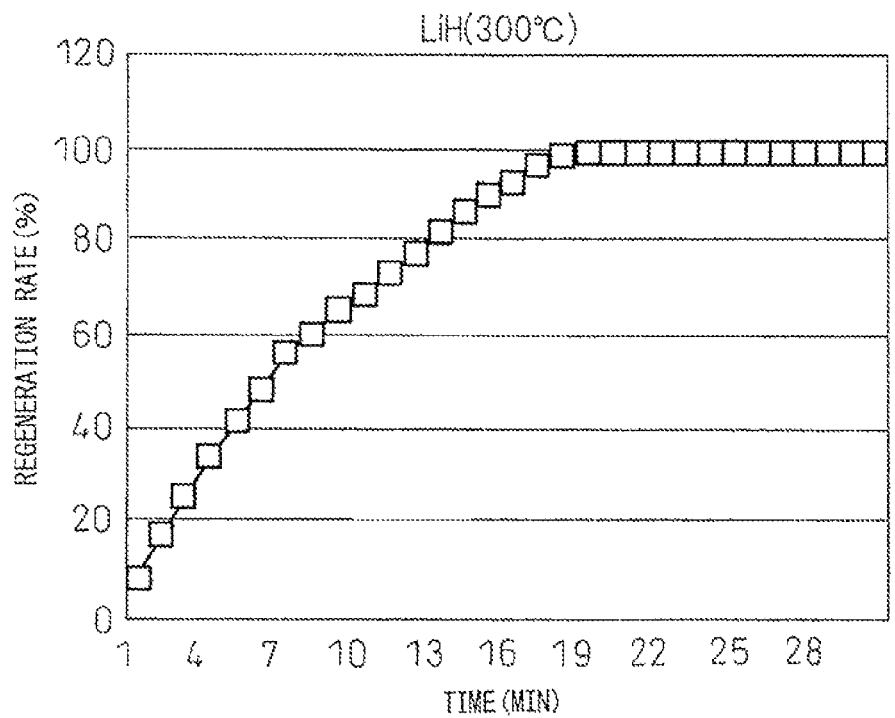
Figure 12:
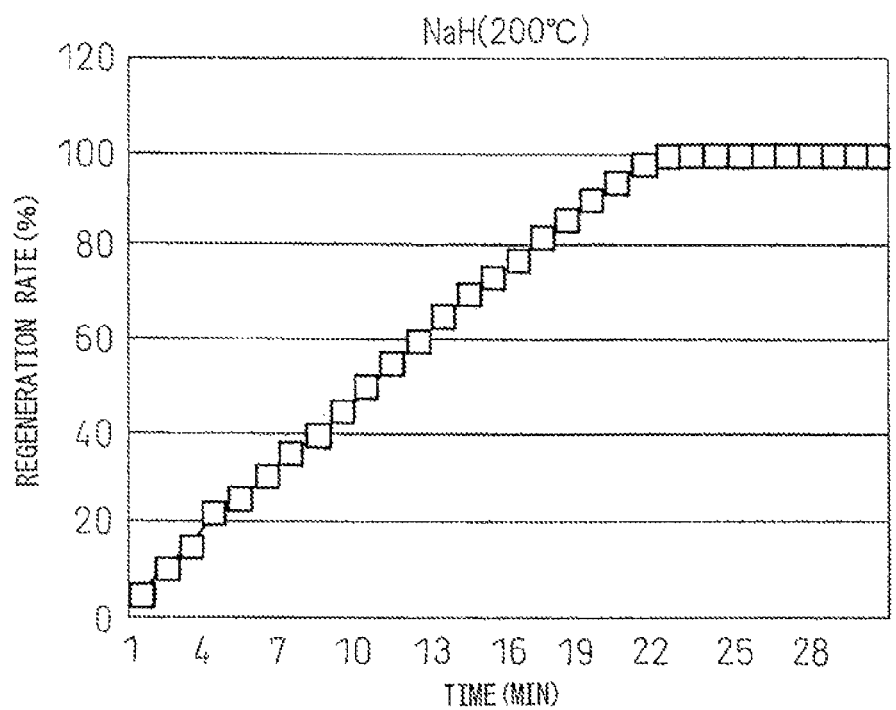
Figure 13:
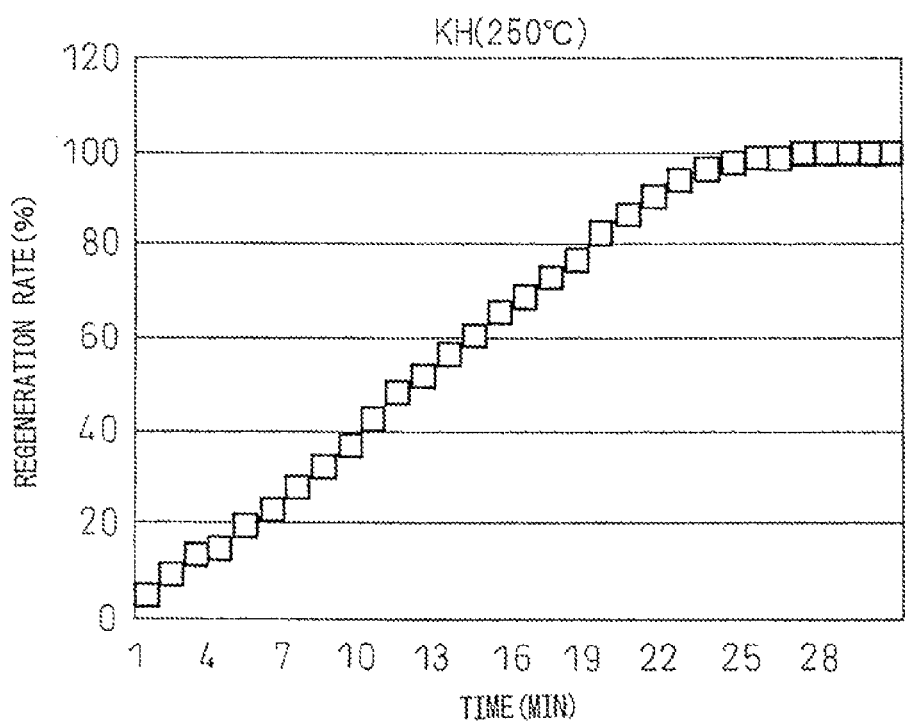

FIG. 1 shows an operational example of a hydrogen generator.
FIG. 2 shows another operational example of a hydrogen generator.
FIG. 3 shows an example of an ammonia-burning internal combustion engine.
FIG. 4 shows another example of an ammonia-burning internal combustion engine.
FIG. 5 shows another example of an ammonia-burning internal combustion engine.
FIG. 6 shows another example of an ammonia-burning internal combustion engine.
FIG. 7 shows an example of a fuel cell.
FIG. 8 shows a hydrogen generation property of lithium hydride.
FIG. 9 shows a hydrogen generation property of sodium hydride.
FIG. 10 shows a hydrogen generation property of potassium hydride.
FIG. 11 shows a regeneration property of lithium hydride.
FIG. 12 shows a regeneration property of sodium hydride.
FIG. 13 shows a regeneration property of potassium hydride.

BEST MODE FOR CARRYING OUT THE INVENTION

Hydrogen Generator

The hydrogen generator described here comprises:
a first ammonia conversion part having a hydrogen-generating material which reacts with ammonia in a first temperature range so as to generate hydrogen;
a second ammonia conversion part having an ammonia-decomposing catalyst which decomposes ammonia into hydrogen and nitrogen in a second temperature range;
an ammonia supply part which supplies ammonia; and
an ammonia supply passage which supplies ammonia from the ammonia supply part to the first and second ammonia conversion parts.

In this hydrogen generator, the first temperature range includes temperatures lower than the second temperature range. In other words, this hydrogen generator can generate hydrogen in the first ammonia conversion part at a temperature lower than the temperature for the hydrogen generation in the second ammonia conversion part.

Further, this hydrogen generator generates hydrogen from ammonia by selectively using the first and second ammonia conversion parts. This switching of the ammonia conversion parts can be carried out, depending on the first temperature range in which hydrogen can be generated by feeding ammonia to the hydrogen-generating material, and the second temperature range in which ammonia can be decomposed into hydrogen and nitrogen by feeding ammonia to an ammonia decomposing catalyst.

In other words, when the first ammonia conversion part has a temperature in the first temperature range, hydrogen can be generated from ammonia in the first ammonia conversion part, and when the second ammonia conversion part has a temperature in the second temperature range, hydrogen can be generated from ammonia in the second ammonia conversion part. Optionally, the hydrogen generation in the first ammonia conversion part and the hydrogen generation in the second ammonia conversion part can be carried out at the same time.

The operation of the hydrogen generator may be, for example, as shown in FIG. 1 (a) to (c). The hydrogen generator shown in FIG. 1 has a first ammonia conversion part 10, a second ammonia conversion part 20, an ammonia supply part 30, and an ammonia supply passage which supplies ammonia from the ammonia supply part 30 to the first and second ammonia conversion parts 10 and 20.

In the use of this hydrogen generator 100, ammonia ($NH_3$) is supplied from the ammonia supply part 30 to the first ammonia conversion part 10 so as to generate hydrogen ($H_2$) in the first ammonia conversion part 10, as shown in FIG. 1 (a), and ammonia is supplied from the ammonia supply part 30 to the second ammonia conversion part 20 so as to generate hydrogen in the second ammonia conversion part 20, as shown in FIG. 1 (b). In addition, optionally, ammonia is supplied from the ammonia supply part 30 to the first and second ammonia conversion parts 10 and 20 so as to generate hydrogen in both the first and second ammonia conversion parts 10 and 20, as shown in FIG. 1 (c).

<Hydrogen Generator—Regeneration of the Hydrogen-Generating Material in the First Ammonia Conversion Part>

In one aspect of the hydrogen generator, the hydrogen generator comprises a hydrogen passage for recycling, which supplies the hydrogen obtained in the second ammonia conversion part to the first ammonia conversion part. According to this hydrogen passage for recycling, the hydrogen obtained in the second ammonia conversion part is supplied to the first ammonia conversion part so as to regenerate the hydrogen-generating material after the hydrogen-generating reaction. In other words, in this aspect, when hydrogen can be generated in the second ammonia conversion part which requires a relatively high temperature range, the hydrogen-generating material in the first ammonia conversion part is regenerated, and thereby is made ready for a situation in which hydrogen cannot be generated in the second ammonia conversion part, a situation in which hydrogen has to be generated in the first ammonia conversion part as well as the second ammonia conversion part, and other similar situations.

Specifically, in the case where an excessive amount of hydrogen is generated in the second ammonia conversion part, for example, in the case where hydrogen is supplied to the internal combustion engine main unit by the hydrogen generator to generate motor power, and the internal combustion engine main unit is run in the idle state, this regeneration can be carried out.

The hydrogen generator can comprise a heat source which provides heat to the first ammonia conversion part. According to this, in addition to the hydrogen obtained in the second ammonia conversion part, the heat from the heat source can be provided to the first ammonia conversion part. In the case where the reaction for generating hydrogen from the hydrogen-generating material and ammonia is an exothermic reaction, the reaction for regenerating the hydrogen-generating material after the reaction is an endothermic reaction, and therefore the regeneration of the hydrogen-generating material can be enhanced by providing heat.

Furthermore, the provision of heat to the first ammonia conversion part is sometimes preferred in order to increase the reaction rate of the reaction between ammonia and the hydrogen-generating material which generates hydrogen. In other words, when the reaction for generating hydrogen from ammonia and the hydrogen-generating material is an exothermic reaction, the reaction equilibrium shifts against hydrogen generation by providing heat to the first ammonia conversion part. However, as far as the equilibrium after providing the heat is for the hydrogen generation, it is sometimes preferred to provide heat to the first ammonia conversion part, and thereby provide the activation energy for enhancing the reaction.

As this heat source, any heat source can be used. For example, a heating unit, such as a heater and a heat storage material can be used. In addition, as this heat source, it is possible to use the combustion/oxidation heat arising from the combustion/oxidation of hydrogen generated in the first and/or second ammonia conversion parts.

The operation of the hydrogen generator in this aspect may be, for example, as shown in FIG. 2 (*a*). In the use of this hydrogen generator 200, as shown in FIG. 2 (*a*), ammonia is supplied from the ammonia supply part 30 to the second ammonia conversion part 20 to generate hydrogen, and at least part of the hydrogen thus obtained is supplied from the second ammonia conversion part 20 to the first ammonia conversion part 10 through the hydrogen passage for recycling, and thereby regenerate the hydrogen-generating material in the ammonia conversion part 10. In addition, optionally, as shown in FIG. 2 (*a*), the regeneration of the hydrogen-generating material is enhanced by providing heat to the ammonia conversion part 10.

<Hydrogen Generator—Heat Provision to the Second Ammonia Conversion Part>

In one aspect of the hydrogen generator, the hydrogen generator can comprise a heat source which provides heat to the second ammonia conversion part. The decomposition reaction for decomposing ammonia into hydrogen and nitrogen in the second ammonia conversion part requires a relatively high temperature. Further, since this decomposition reaction is an endothermic reaction, thermal energy has to be provided. Thus, heat is sometimes preferably provided to the second ammonia conversion part to enhance the decomposition reaction for decomposing ammonia into hydrogen and nitrogen.

As this heat source, any heat source can be used. For example, a heating unit such as a heater and a heat storage material can be used. In addition, as this heat source, it is possible to use the combustion/oxidation heat arising from the combustion/oxidation of the hydrogen generated in the first and/or second ammonia conversion parts.

<Hydrogen Generator—Other Aspects>

In one aspect of the hydrogen generator, all of the hydrogen obtained in the second ammonia conversion part is supplied to the first ammonia conversion part.

This hydrogen generator is sometimes since the passage for withdrawing hydrogen directly from the second ammonia conversion part can be omitted, and thus, operation of the hydrogen generator can be simplified.

This hydrogen generator is, for example, as shown in FIG. 2 (*b*). In the hydrogen generator 220 shown in FIG. 2 (*b*), ammonia is supplied from the ammonia supply part 30 to the second ammonia conversion part 20, and the hydrogen obtained in this second ammonia conversion part 20 is withdrawn through the first ammonia conversion part 10.

Further, in one aspect of the hydrogen generator, the ammonia is supplied by the ammonia supply part to the first ammonia conversion part only through the second ammonia conversion part.

This hydrogen generator is sometimes since the passage for supplying ammonia from the ammonia supply part directly to the first ammonia conversion part can be omitted, and thus, operation of the hydrogen generator can be simplified.

This hydrogen generator is, for example, as shown in FIG. 2 (*c*). In the hydrogen generator 240 shown in FIG. 2 (*c*), ammonia is supplied from the ammonia supply part 30 to the second ammonia conversion part 20, and the ammonia is supplied through this second ammonia conversion part 20 to the first ammonia conversion part 10, and thereby generates hydrogen in this first ammonia conversion part 10.

<Hydrogen Generator—Hydrogen-Generating Material>

The hydrogen-generating material which can be used in the hydrogen generator may be any material which reacts with ammonia to generate hydrogen in the first temperature range including temperatures lower than the second temperature range.

This hydrogen-generating material is preferably a material which generates hydrogen by reaction with ammonia under room temperature without heating. In addition, the hydrogen-generating material is preferably a material which reacts with ammonia to generate hydrogen in the temperature range comprising, at least, 0° C. to 30° C. The fact that the hydrogen-generating material reacts with ammonia to generate hydrogen at room temperature in this way is sometimes preferred in order to initiate the hydrogen generation in the first ammonia generation part without heat or with little heat externally provided.

As the hydrogen-generating material, a material which is known to ignite or emit a flammable gas in contact with air or water can be considered.

As a specific hydrogen-generating material, a material selected from the group consisting of alkali metals, alkali earth metals, alkali metal hydrides, alkali earth metal hydrides, and a combination thereof can be exemplified. Therefore, as the hydrogen generation reaction between the hydrogen-generating material and ammonia, the reactions shown by Equations (1) to (4) below are exemplified ($M^I$ means an alkali metal. (Li, Na, K, etc.), and $M^{II}$ means an alkali earth metal (Mg, Ba, etc.)):

$M^I H+NH (endothermic) \leftarrow\rightarrow M^I NH_2 + H_2$ (exothermic)   Equation (1)

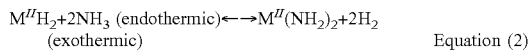

$M^{II} H_2 + 2NH_3$ (endothermic) $\leftarrow\rightarrow M^{II}(NH_2)_2 + 2H_2$ (exothermic)   Equation (2)

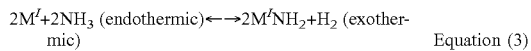

$2M^I + 2NH_3$ (endothermic) $\leftarrow\rightarrow 2M^I NH_2 + H_2$ (exothermic)   Equation (3)

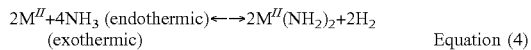

$2M^{II} + 4NH_3$ (endothermic) $\leftarrow\rightarrow 2M^{II}(NH_2)_2 + 2H_2$ (exothermic)   Equation (4)

As a particular hydrogen generator, specifically a material selected from the group consisting of alkali metal hydrides, alkali earth metal hydrides, and a combination thereof; more specifically a material selected from the group consisting of lithium hydride, sodium hydride, potassium hydride, and a combination thereof can be exemplified. These materials are preferable in that these materials can react with ammonia to generate hydrogen in room temperature. Furthermore, these materials are preferable in that these materials can be regenerated by reacting with hydrogen at a relatively low temperature, for example, at 200° C. to 300° C.

<Hydrogen Generator—Ammonia-Decomposing Catalyst>

The ammonia-decomposing catalyst usable for the hydrogen generator may be any material which enhances the reaction which decomposes ammonia into hydrogen and nitrogen.

Note that, in the reaction which decomposes ammonia to obtain hydrogen and nitrogen in the second ammonia conversion part, as shown in the equation (5) and Table 1 below, the molar number of the gas, in other words, the volume at the same temperature becomes twice after the decomposition reaction so that the conversion rate of this reaction can be determined using a flow meter and a thermometer before and after the second ammonia conversion part:

$2NH_3 \rightarrow 3H_2 + N_2$ (endothermic)   Equation (5)

TABLE 1

Correlation between the decomposition rate of ammonia and the flow rates at the inlet and the outlet of the conversion part

| Decomposition rate (%) | Inlet NH$_3$ (mol) | Outlet NH$_3$ (mol) | Outlet H$_2$ (mol) | Outlet N$_2$ (mol) | Total (mol) |
|---|---|---|---|---|---|
| 0 | 100 | 100 | 0 | 0 | 100 |
| 10 | 100 | 90 | 15 | 5 | 110 |
| 20 | 100 | 80 | 30 | 10 | 120 |
| 30 | 100 | 70 | 45 | 15 | 130 |
| 40 | 100 | 60 | 60 | 20 | 140 |
| 50 | 100 | 50 | 75 | 25 | 150 |
| 60 | 100 | 40 | 90 | 30 | 160 |
| 70 | 100 | 30 | 105 | 35 | 170 |
| 80 | 100 | 20 | 120 | 40 | 180 |
| 90 | 100 | 10 | 135 | 45 | 190 |
| 100 | 100 | 0 | 150 | 50 | 200 |

This ammonia-decomposing catalyst is preferably a catalyst comprising a metal which can decompose ammonia into hydrogen and nitrogen only when heated from room temperature. As a particular ammonia-decomposing catalyst, a catalyst comprising a metal selected from the group consisting of the transition metals, specifically, a catalyst comprising a metal selected from the group consisting of ruthenium, nickel, cobalt, and iron is exemplified. These metals enable the decomposition reaction of ammonia at a relatively low temperature. For example, ruthenium can enhance the decomposition reaction of ammonia even at the temperature of around 300° C.

<Ammonia-Burning Internal Combustion Engine>

The ammonia-burning internal combustion engine shown here comprises the above hydrogen generator and the internal combustion engine main unit, and the internal combustion engine main unit burns the hydrogen supplied from the hydrogen generator, in addition to ammonia, so as to generate motor power. As the internal combustion engine main unit, any internal combustion engine main unit which can burn ammonia to generate motor power can be exemplified, for example, as shown in Japanese Unexamined Patent Publication (Kokai) No. 5-332152.

According to this ammonia-burning internal combustion engine, hydrogen is supplied in a wide temperature range by the above hydrogen generator, and the burning of ammonia is assisted by this hydrogen so that preferable motor power generation can be accomplished at the time of starting, acceleration, etc. When the exhaust gas of the internal combustion engine main unit is used as the heat source for hydrogen generation, the temperature of the exhaust gas is low at the time of starting of the internal combustion engine main unit, and heat cannot be sufficiently provided to the second ammonia conversion part, so that hydrogen cannot be generated at the second ammonia conversion part. However, this ammonia-burning internal combustion engine can appropriately supply hydrogen to the internal combustion engine main unit by the first ammonia conversion part which can generate hydrogen at a relatively low temperature, even when the temperature of the exhaust gas is low, for example when starting, etc. The molar ratio (ammonia:hydrogen) between ammonia and hydrogen which are burnt in the internal combustion engine main unit may be, for example, in the range of 100:0 to 50:50, specifically 100:0 to 80:20.

Note that, in the burning of ammonia, the combustion reaction as shown in Equation (6) below can be carried out. The reaction does not contribute to global warming, since it does not generate carbon dioxide:

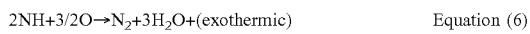

$2NH+3/2O \rightarrow N_2 + 3H_2O +$(exothermic)   Equation (6)

This ammonia-burning internal combustion engine is, for example, as shown in FIG. 3. The ammonia-burning internal combustion engine 300 shown in FIG. 3 comprises a hydrogen generator 310, the internal combustion engine main unit 40, and flow meters $M_4$ and $M_5$. This hydrogen generator 310 comprises a first ammonia conversion part 10, a second ammonia conversion part 20, an ammonia supply part 30, and an ammonia supply passage 31 which supplies ammonia from the ammonia supply part 30 to the first and the second ammonia conversion parts 10 and 20.

In the use of this ammonia-burning internal combustion engine, ammonia is supplied from the ammonia supply part 30 to the internal combustion engine main unit 40 through the flow meter $M_1$ and $M_2$. Together therewith, by adjusting with the valves $V_1$ and $V_2$ as needed, ammonia is supplied from the ammonia supply part 30 to both or either one of the first and the second ammonia conversion parts 10 and 20 through flow meters $M_3$ and $M_5$, and thereby generate hydrogen. The obtained hydrogen is supplied to the internal combustion engine main unit 40.

In addition, when the hydrogen generator 310 used comprises a hydrogen passage for recycling 21 which supplies the hydrogen obtained in the second ammonia conversion part 20 to the first ammonia conversion part 10, hydrogen is supplied to the first ammonia conversion part 10 through the flow meter $M_2$ with the amount of hydrogen which flows in the hydrogen passage for recycling 21 adjusted with the valve $V_3$, and thereby regenerate the hydrogen-generating material in the ammonia conversion part 10.

<Ammonia-Burning Internal Combustion Engine—Exhaust Gas Passage for Heat Exchange>

The ammonia-burning internal combustion engine can further comprise an exhaust gas passage for heat exchange, which provides heat to the first and/or second ammonia conversion parts by the exhaust gas from the internal combustion engine main unit.

According to this ammonia-burning internal combustion engine, the heat required in the first and/or second ammonia conversion parts is provided by the exhaust gas from the internal combustion engine main unit. Regarding the hydrogen generator, as described above, the heat is sometimes preferably provided to the first and second ammonia conversion parts in order to increase the reaction rate of the hydrogen generation reaction and/or enhance regeneration of the hydrogen-generating material in the first ammonia conversion part, to enhance ammonia decomposition in the second ammonia conversion part, etc.

This exhaust gas passage for heat exchange can comprise a bypass passage, through which the exhaust gas bypasses the first ammonia conversion part. As described above, the reaction of the hydrogen-generating material and ammonia in the first ammonia conversion part could be an exothermic reaction. Therefore, when the regeneration of the hydrogen-generating material is not underway in the first ammonia conversion part, the equilibrium of the reaction can be made to proceed toward hydrogen generation, by preventing the heating of the hydrogen-generating material with the exhaust gas and thereby maintaining the hydrogen-generating material at a relatively low temperature.

This ammonia-burning internal combustion engine is, for example, as shown in FIG. 4. The ammonia-burning internal combustion engine 400 shown in FIG. 4 comprises a hydrogen generator 410 and an internal combustion engine main unit 40. This ammonia-burning internal combustion engine 400 further comprises an exhaust gas passage for heat exchange 41 which can provide heat to the first and/or second ammonia conversion parts 10 and 20 by the exhaust gas from the internal combustion engine main unit 40, in addition to the constitution of an ammonia-burning internal combustion engine 300 shown in FIG. 3. This exhaust gas passage for heat exchange 41 can comprise a first heat exchanger 15 which can provide heat to the first ammonia conversion part 10, a second heat exchanger 25 which can provide heat to the second ammonia conversion part 20, and a pipe through which the exhaust gas flows.

When this exhaust gas passage for heat exchange has a bypass passage 42, through which the exhaust gas bypasses the first ammonia conversion part, the heating of the hydrogen-generating material by the exhaust gas can be prevented by adjusting, with the valve $V_4$, the amount of the exhaust gas which flows through this bypass passage 42.

<Ammonia-Burning Internal Combustion Engine—Other Aspects>

In one aspect of the ammonia-burning internal combustion engine, the ammonia-burning internal combustion engine supplies all of the hydrogen obtained in the second ammonia conversion part to the first ammonia conversion part.

This ammonia-burning internal combustion engine is sometimes since the passage for supplying hydrogen from the second ammonia conversion part directly to the internal combustion engine main unit can be omitted, and thus, the operation of the ammonia-burning internal combustion engine can be simplified.

This ammonia-burning internal combustion engine is, for example, as shown in FIG. 5. The ammonia-burning internal combustion engine 500 shown in FIG. 5 comprises a hydrogen generator 510 and an internal combustion engine main unit 40. This ammonia-burning internal combustion engine 500 differs from the ammonia-burning internal combustion engine 400 shown in FIG. 4, only in that the former does not comprise a passage, a valve, etc. for supplying hydrogen from the second ammonia conversion part 20 directly to the internal combustion engine main unit 40.

Further, in one aspect of the ammonia-burning internal combustion engine, the ammonia supplied by the ammonia supply part is supplied to the first ammonia conversion part only through the second ammonia conversion part.

This ammonia-burning internal combustion engine is sometimes since the passage for supplying ammonia from the ammonia supply part directly to the first ammonia conversion part can be omitted, and thus, operation of the ammonia-burning internal combustion engine can be simplified.

This ammonia-burning internal combustion engine is, for example, as shown in FIG. 6. The ammonia-burning internal combustion engine 600 shown in FIG. 6 comprises a hydrogen generator 610 and an internal combustion engine main unit 40. This ammonia-burning internal combustion engine 600 differs from the ammonia-burning internal combustion engine 400 shown in FIG. 4, only in that the former does not comprise a passage, a valve, etc. for supplying hydrogen from the second ammonia conversion part 20 directly to the internal combustion engine main unit 40, and a passage, a valve, etc. for supplying ammonia from the ammonia supply part 30 directly to the first ammonia conversion part 10. Furthermore, this ammonia-burning internal combustion engine 600 differs from the ammonia-burning internal combustion engine 500 shown in FIG. 5, only in that the former does not comprise a passage, a valve, etc. for supplying ammonia from the ammonia supply part 30 directly to the first ammonia conversion part 10.

As described above, according to the ammonia-burning internal combustion engine where the exhaust gas of the internal combustion engine main unit is used as the heat source for hydrogen generation, when the temperature of the exhaust gas is low as in the case of starting of the internal combustion engine main unit, hydrogen is generated in the first conversion part which generates hydrogen at a relatively low temperature specifically by an exothermic reaction, and when the temperature of the exhaust gas becomes high, the heat of this exhaust gas is provided to the second ammonia conversion part so that hydrogen is generated in the second ammonia conversion part which generates hydrogen at a relatively high temperature by an endothermic reaction. By generating hydrogen in this manner, hydrogen can be generated over almost the entire operating range of the internal combustion engine. Further, after the temperature of the exhaust gas becomes high, the hydrogen-generating material, which is required when the temperature of the exhaust gas is low as in the case of the next start time, can be regenerated in the first ammonia conversion part by providing heat of the exhaust gas to the first ammonia conversion part.

<Fuel Cell>

The fuel cell described here comprises a hydrogen generator and a fuel cell main unit described above, and generates electric power by oxidizing hydrogen supplied by the hydrogen generator. As the fuel cell main unit, any fuel cell main unit using hydrogen as the fuel can be exemplified, and the fuel cell is already known in the art.

According to this fuel cell, hydrogen can be provided in a wide temperature range, and therefore electric power can be generated in a wide temperature range.

This fuel cell is, for example, as shown in FIG. 7. The fuel cell 700 shown in FIG. 7 comprises a hydrogen generator 710 and a fuel cell main unit 50. This hydrogen generator 710 comprises a first ammonia conversion part 10, a second ammonia conversion part 20, an ammonia supply part 30, and an ammonia supply passage 31 which supplies ammonia from the ammonia supply part 30 to the first and second ammonia conversion parts 10 and 20.

In the use of this fuel cell 700, ammonia is supplied from the ammonia supply part 30 to both or either one of the first and the second ammonia conversion parts 10 and 20 through the flow meters $M_1$ and $M_5$ by adjusting the valves $V_1$ and $V_2$, and thereby generate hydrogen. The obtained hydrogen is supplied to the fuel cell main unit 50.

In addition, when this hydrogen generator 710 comprises a hydrogen passage for recycling 21 which supplies the hydrogen obtained in the second ammonia conversion part 20 to the first ammonia conversion part 10, hydrogen can be supplied to the first ammonia conversion part 10, and thereby regenerate the hydrogen-generating material in the ammonia conversion part 10 by adjusting the amount of hydrogen which flows in this hydrogen passage for recycling 21 with the valve $V_3$.

Note that, for simplification, in FIGS. 1 to 7 show only embodiments wherein the conversion rate from ammonia to hydrogen at the first and second ammonia conversion parts is 0% or 100%. However, the present invention is not limited to these, and the conversion rate at the first and second ammonia conversion parts may be any value.

Examples

Hydrogen-Generating Material

The hydrogen generation property and the regeneration property of hydrogen-generating materials were evaluated below.

As a hydrogen-generating material, lithium hydride (LiH), sodium hydride (NaH), and potassium hydride (KH) were evaluated. These generate hydrogen and are regenerated respectively by the reactions as shown below:

$$LiH + NH_3 \leftrightarrow LiNH_2 + H_2 + 43 \text{ kcal/mol}$$

$$NaH + NH_3 \leftrightarrow NaNH_2 + H_2 + 21 \text{ kcal/mol}$$

$$KH + NH_3 \leftrightarrow KNH_2 + H_2 + 25 \text{ kcal/mol}$$

Hydrogen generation by a hydrogen-generating material (the reaction which proceeds from the left part to the right part of the above equation) was evaluated by the amount of hydrogen produced in one minute when ammonia was provided to 1 g of the hydrogen-generating material over the temperature range of −30° C. to 150° C. The results of lithium hydride, sodium hydride, and potassium hydride are shown in FIGS. 8, 9, and 10, respectively. From these results, it is understood that, even at the temperature of −30° C., the hydrogen generation reaction proceeds, and as the temperature increases, the reaction rate increases.

In addition, the regeneration of the hydrogen-generating material after hydrogen generation (the reaction which proceeds from the right part to the left part of the above equation) was evaluated as the change in the regeneration rate over time, at the temperatures of 300° C., 200° C., and 250° C. for lithium hydride, sodium hydride, and potassium hydride, respectively. The results of lithium hydride, sodium hydride, and potassium hydride are shown in FIGS. 11, 12, and 13, respectively. From these results, it is understood that the hydrogen-generating materials are regenerated at a significant rate at the temperatures of 200° C. to 300° C.

<Ammonia-Decomposing Catalyst>

The ammonia decomposition property by ammonia-decomposing catalysts, which are usable in the hydrogen generator, was evaluated below.

As an ammonia-decomposing catalyst, nickel supported by alumina ($Ni/Al_2O_3$), cobalt-lanthanum supported by silica (Co—$La/SiO_2$), ruthenium supported by alumina ($Ru/Al_2O_3$) and ruthenium-barium supported by activated charcoal (Ru—Ba/activated charcoal) were evaluated by supplying ammonia at the temperatures of 400° C. to 600° C. The results are shown in Table 2.

TABLE 2

Ammonia decomposition properties of ammonia-decomposing catalysts

| Catalyst | | $Ni/Al_2O_3$ | $Co-La/SiO_2$ | $Ru/Al_2O_3$ | Ru-Ba/Activated charcoal |
|---|---|---|---|---|---|
| | Space velocity | 1800 | 1200 | 710 | 1720 |
| Decomposition rate (%) | Reaction temperature (° C.) | 400 | 2.1 | 16.7 | 97.5 | 99.0 |
| | | 500 | 5.3 | 93.3 | 99.5 | 99.5 |
| | | 600 | 40.8 | 93.9 | 99.5 | 99.9 |

From Table 2, it is understood that, while these ammonia-decomposing catalysts require temperatures of over 300° C. for the ammonia decomposition reaction, almost all ammonia can be decomposed into hydrogen and nitrogen when the required temperature is available.

The invention claimed is:

1. A process for generating hydrogen by a hydrogen generator comprising the steps of:
   generating hydrogen from ammonia by selectively using:
      a reaction of a hydrogen-generating material with ammonia in a first ammonia conversion part to produce hydrogen; and
      decomposition of ammonia into hydrogen and nitrogen by an ammonia-decomposing catalyst in a second ammonia conversion part;
   supplying ammonia from an ammonia supply part to the first ammonia conversion part and the second ammonia conversion part through an ammonia supply passage;
   recycling the hydrogen obtained in the second ammonia conversion part to the first ammonia conversion part through a hydrogen passage for recycling; and
   providing heat to the first ammonia conversion part and/or the second ammonia conversion part from a heat source, wherein:
   said hydrogen-generating material is a material selected from the group consisting of alkali metals, alkali earth metals, alkali metal hydrides, alkali earth metal hydrides, and a combination thereof; and said ammonia-decomposing catalyst comprises a metal selected from the group of transition metals.

2. The process according to claim 1, wherein said heat source is the combustion/oxidation heat arising from the combustion/oxidation of hydrogen generated in the first and/or second ammonia conversion parts.

3. The process according to claim 1, which supplies all of the hydrogen obtained in the second ammonia conversion part to the first ammonia conversion part.

4. The process according to claim 1, which supplies the ammonia supplied by said ammonia supply part to the first ammonia conversion part only through the second ammonia conversion part.

5. The process according to claim 1, wherein said hydrogen-generating material is a material selected from the group consisting of alkali metal hydrides, alkali earth metal hydrides, and a combination thereof.

6. The process according to claim 5, wherein said hydrogen-generating material is a material selected from the group consisting of lithium hydride, sodium hydride, potassium hydride, and a combination thereof.

7. The process according to claim 1, wherein said ammonia-decomposing catalyst comprises a metal selected from the group of ruthenium, nickel, cobalt, and iron.

8. An ammonia-burning internal combustion engine, having a hydrogen generator and an internal combustion engine main unit, the hydrogen generator comprising:
   a first ammonia conversion part having a hydrogen-generating material that reacts with ammonia to generate hydrogen;
   a second ammonia conversion part having an ammonia-decomposing catalyst that decomposes ammonia into hydrogen and nitrogen;
   an ammonia supply part configured to supply ammonia;
   an ammonia supply passage fluidly connected to the ammonia supply part, the first ammonia conversion part and the second ammonia conversion part, the ammonia supply passage being configured to supply ammonia from the ammonia supply part to the first ammonia conversion part and the second ammonia conversion part;
   a hydrogen passage for recycling fluidly connected to the first ammonia conversion part and the second ammonia conversion part, the hydrogen passage being configured to supply the hydrogen obtained in the second ammonia conversion part to the first ammonia conversion part; and
   a heat source configured to provide heat to the first ammonia conversion part and/or the second ammonia conversion part;
   wherein:
   hydrogen is generated from ammonia by selectively using the first ammonia conversion part and the second ammonia conversion part;
   the hydrogen-generating material is a material selected from the group consisting of: alkali metals, alkali earth metals, alkali metal hydrides, alkali earth metal hydrides, and a combination thereof;
   the ammonia-decomposing catalyst comprises a metal selected from the group of transition metals;
   said hydrogen generator generates hydrogen by the process according to claim 1, and
   said internal combustion engine main unit generates motor power by combusting, in addition to ammonia, hydrogen which is supplied by said process.

9. The ammonia-burning internal combustion engine according to claim 8, further having an exhaust gas passage for heat exchange, which provides heat to the first and/or second ammonia conversion parts by the exhaust gas from said internal combustion engine main unit.

10. The ammonia-burning internal combustion engine according to claim 9, wherein said exhaust gas passage for heat exchange has a bypass passage, through which said exhaust gas bypasses the first ammonia conversion part.

11. The ammonia-burning internal combustion engine according to claim 8, wherein the molar ratio of ammonia and hydrogen which are combusted in said internal combustion engine main is in the range of 100:0 to 50:50.

12. A fuel cell having a hydrogen generator and a fuel cell main unit, the hydrogen generator comprising:
   a first ammonia conversion part having a hydrogen-generating material that reacts with ammonia to generate hydrogen;
   a second ammonia conversion part having an ammonia-decomposing catalyst that decomposes ammonia into hydrogen and nitrogen;
   an ammonia supply part configured to supply ammonia;
   an ammonia supply passage fluidly connected to the ammonia supply part, the first ammonia conversion part and the second ammonia conversion part, the ammonia supply passage being configured to supply ammonia from the ammonia supply part to the first ammonia conversion part and the second ammonia conversion part;
   a hydrogen passage for recycling fluidly connected to the second ammonia conversion part and the first ammonia conversion part, the hydrogen passage being configured to supply the hydrogen obtained in the second ammonia conversion part to the first ammonia conversion part; and
   a heat source configured to provide heat to the first ammonia conversion part and/or the second ammonia conversion part;
   wherein:
   hydrogen is generated from ammonia by selectively using the first ammonia conversion part and the second ammonia conversion part;
   the hydrogen-generating material is a material selected from the group consisting of: alkali metals, alkali earth metals, alkali metal hydrides, alkali earth metal hydrides, and a combination thereof;
   the ammonia-decomposing catalyst comprises a metal selected from the group of transition metals;
   said hydrogen generator generates hydrogen by the process according to claim 1, and
   said fuel cell main unit generates electric power by oxidizing the hydrogen supplied by said process.

* * * * *